US007159298B2

(12) United States Patent
Lieberman

(10) Patent No.: US 7,159,298 B2
(45) Date of Patent: Jan. 9, 2007

(54) METHOD FOR THE FORMATION OF RF ANTENNAS BY DEMETALLIZING

(76) Inventor: Daniel Lieberman, 9475 Chesapeake Dr. Suite A., San Diego, CA (US) 92123

( * ) Notice: Subject to any disclaimer, the term of this patent is extended or adjusted under 35 U.S.C. 154(b) by 0 days.

(21) Appl. No.: 09/809,121

(22) Filed: Mar. 15, 2001

(65) Prior Publication Data

US 2002/0129488 A1 Sep. 19, 2002

(51) Int. Cl.
*H01Q 13/00* (2006.01)
(52) U.S. Cl. .............................. 29/601; 29/417; 29/600; 29/602.1; 29/847; 216/13; 216/91; 216/100; 216/102; 216/105; 343/726; 343/741; 343/895; 343/700 MS
(58) Field of Classification Search ................ 29/600, 29/601, 602.1, 847, 417; 216/13, 91, 100, 216/102, 105, 24; 343/741, 895, 726, 700 MS
See application file for complete search history.

(56) References Cited

U.S. PATENT DOCUMENTS

| 4,816,836 | A | * | 3/1989 | Lalezari | 343/700 MS |
|---|---|---|---|---|---|
| 5,245,745 | A | * | 9/1993 | Jensen et al. | 29/600 |
| 5,367,308 | A | * | 11/1994 | Weber | 343/700 MS |
| 5,381,137 | A | * | 1/1995 | Ghaem et al. | 340/572.5 |
| 5,463,404 | A | * | 10/1995 | Wall | 343/700 MS |
| 5,830,529 | A | * | 11/1998 | Ross | 427/152 |
| 5,861,226 | A | * | 1/1999 | Horne et al. | 430/5 |
| 5,952,971 | A | * | 9/1999 | Strickland | 343/700 MS |
| 5,977,931 | A | * | 11/1999 | Openlander | 343/895 |
| 5,987,739 | A | * | 11/1999 | Lake | 29/841 |
| 6,087,940 | A | * | 7/2000 | Caperna et al. | 340/572.5 |
| 6,147,662 | A | * | 11/2000 | Grabau et al. | 343/895 |
| 6,265,977 | B1 | * | 7/2001 | Vega et al. | 340/572.7 |
| 6,281,842 | B1 | * | 8/2001 | Moren | 343/700 MS |

* cited by examiner

*Primary Examiner*—Paul D. Kim
(74) *Attorney, Agent, or Firm*—David E. Heisey; Sheppard Mullin Richter & Hampton LLP

(57) ABSTRACT

A thin and flexible radio frequency (RF) antenna tag or label is disclosed which contains an RF circuit connected to an antenna which is created by demetallizing the area around the antenna pattern on a thin, metallized substrate such as a film or paper web. Antenna(s) may be formed on one or both sides of the substrate and can contain printed, holographic, optical variable device, diffractive, dot matrix, computer-generated holograms or computer-generated optical images. The demetallized RF antenna on the substrate can optionally further be transferred to a second substrate or web by means of a cold foil stamping process. The tag or label is thin and flexible, enabling a wide range of applications including RF tagging of anti-theft devices, product packaging of all types, credit cards, passports, admission tickets, stamps, vehicles, badges, fare cards, roadway tolls, customs and immigration checkpoints identification, and animal identification/tracking devices.

18 Claims, 5 Drawing Sheets

METHOD FOR THE FORMATION OF RF ANTENNAS BY DEMETALLIZING

BACKGROUND OF THE INVENTION

1. Field of the Invention

This invention relates to the field of radio frequency (RF) tagging. More specifically, the invention relates to an improved method for creating an RF antenna on a lightweight, flexible substrate through demetallization of the substrate around the antenna pattern, leaving the metallized antenna.

2. Background of the Invention

Radio frequency (RF) tagging or identification is one of many technologies for identifying and/or tracking objects. The RF identification process requires that information be carried on a substrate such as a tag or label containing an antenna. The antenna allows reception and transmission of radio waves. Typically, the tag or label containing the antenna reflects an incident RF carrier back to a base station. It radiates or receives energy and can be structured to radiate or receive energy over varying bandwidths.

The tag usually consists of a semiconductor chip containing RF circuits, logic and memory and it also contains an antenna, the formation of which is the subject of this invention.

A number of methods of manufacture of RF antennas are well known in the field. The principal known techniques for fabricating RF antennas include foil forming, dip brazing and electroforming of metallic-based structures. The antennas are generally loops of wire soldered to a circuit card or consist of metal etched or plated on a circuit card. Much of the prior art has produced thick, stacked and layered tags with components mounted on cards and covered in plastic, resulting in a rigid package. None of the known systems provides for production of antennas of varying densities.

More recent inventions have reduced both the cost and weight of an RF antenna by creating antennas on thin flexible tags, Such a process is described in U.S. Pat. No. 5,528,222. This method embeds metal into the substrate that forms the tag, which requires a high density deposit of metal. The tag or label containing the antenna must then be laminated to an additional substrate, resulting in a thickness of up to 50 micrometers. Such a thickness creates a less flexible tag or label and restricts its range of applications.

Another formation method is described in U.S. Pat. No. 4,220,956, in which the antenna array is created by etching a copper laminate that is adhered to one side of a thin substrate. The structure described claims a total thickness of less than 0.005 inch, which can be manufactured as a thin flexible, rollable, lightweight array. The antenna is created using an etching process substantially the same as that used for forming printed circuit boards and microstrip antennas. In this process, the resulting thickness still reduces the flexibility and applicability of the tag or label.

None of these methods provides an approach to the design and fabrication of RF antennas that reduces cost, thickness, and weight of the antenna tag or label that also increases its flexibility to allow for a virtually unlimited number of applications.

SUMMARY OF THE INVENTION

The present invention provides an improved method for formation of RF antennas, which comprises demetallizing the antenna design leaving a very thin metal layer or metal in varying densities on a single substrate without lamination, resulting in an extremely thin, flexible tag, label or packaging material.

This invention thus provides an improved method of designing antennas on film or paper webs for use in radio frequency identification and/or tracking. Specifically, this invention uses a film or paper web, which is metallized on one or both sides, and demetallizes the antenna pattern on one or both of the metallized sides. This process uses a very thin layer of metal (usually 0.02–0.06 µm) and demetallizes the antenna design or pattern in a uniform density or different densities in the same antenna if required. Because the web thickness is on the order of 25–50 µm, the addition of the antenna has no significant effect on the thickness, and therefore the flexibility, of the web material as a tag or label. Further, there is no requirement for lamination to a label or tag because the antenna is created by demetallizing the area around the antenna design right on the web surface which will later be cut into labels or tags. The preprinted or plain label or tag web with its printed, holographic, optical variable device, diffractive, dot matrix, computer-generated holograms or computer-generated optical images on one side becomes the only substrate required to carry the antenna with its radio frequency circuit on the other side.

The image on the printed side of the label can be printed by flexographic, offset, rotogravure, letter press or any other conventional printing method or can be a holographic, diffractive, optical variable, or diffractive dot-matrix pattern or image which requires metal on both sides. The web can contain holographic continuous wallpaper patterns, diffractive, optical variable devices, holographic and diffractive dot-matrix systems, or non-holographic images or patterns on one side so a registration process is not required. In addition, the web can contain specific holographic or non-bolographic images which require registration of the antennas to those images using a registration process.

This invention therefore provides a method for demetallizing the antenna design on a metallized preprinted film or paper web used for creating labels, tags or packaging. This results in lower cost to produce the RF devices and increases the number of potential applications because of reduced label thickness and weight. Cost is reduced because there are fewer manufacturing steps required and fewer material costs. If the application is flexible or rigid packaging, then the antenna can be demetallized right on the material itself without further processing steps. If the application is a label or tag, the resulting label or tag is flexible, because it consists of only the film or paper with an adhesive backing. The liner is peeled from the back when applying the label or tag to the item to be tracked or read.

This invention represents an improvement over the prior art in several ways. It simplifies the manufacturing process for RF devices. Only one substrate is required for this process, which can be any type of film, paper, or other web material. It also reduces the cost of producing RF devices because of the reduction in material costs and the elimination of production steps. Less metal is deposited and yet can produce any type of antenna, and the need for additional material laminated to the antenna is eliminated.

In addition, because the lamination process is eliminated and only one substrate is required, the tag or label produced is extremely thin and flexible. This creates a tag or label flexible enough for use in variety of both flexible and rigid packaging materials. For example, a flexible RF label can be applied to a bottle or box as a seal or authentication device and it will conform to the package because of its flexibility.

This invention represents an improvement over prior art because it allows for the creation of any type of antenna pattern and a more sophisticated array because of the ability to demetallize a single antenna in varying densities if required. In addition, it also allows the demetallization of antennas on one or both sides of a metallized substrate. These antennas can be different types and can be demetallized in different densities or they can be the same antenna type and density. If having antennas on both sides of a substrate is the desired application, then the antennas must be demetallized in register to each other. These antennas can share the same RF circuit or each antenna can have a different RF circuit for different applications.

The antennas in the present invention can include, reveal or be in register with images created by any desired type of process including holographic, optical variable, dot matrix, diffractive, computer generated holographic, computer-generated optical elements or other known means. Such images, particularly the holographic images, may be placed on the antenna by printing or optical image formation using known embossing, casting or injection molding methods. For instance, an antenna itself can contain holographic images if the metallized substrate is embossed prior to demetallization of the antenna pattern. The holographic image can contain microtext or hidden images on the surface of the antenna which results in the antenna acting as an aesthetic image, a security device and an RF tracking/identification device all in one.

If the antenna patterns are produced for packaging applications, a package can be created that contains multiple RF antennas produced on the same film web. Each antenna can have different applications if desired. Packaging of this kind can result in an antenna of continuous wallpaper design or the antenna can be demetallized on the web packaging material in a specific area. Packaging of this kind can result in antennas in a continuous wallpaper design or antennas can be demetallized on different package types; for example, flexible packaging used in food snack bags or rigid packaging used for cosmetic boxes.

This invention also allows for the creation of antennas through the demetallization process using a cold foil stamping method.

Applications for this invention include, but are not limited to, labels and seals to track virtually anything, memory chips that can contain substantial information about the products they are applied to, verification or identification devices for purchases through the Internet (for example, event tickets), grocery store products, RF ID tagging of anti-theft devices, product packaging of all types, credit cards, passports, admission tickets, stamps, vehicles, badges, fare cards, roadway tolls, customs and immigration checkpoints, and animal identification/tracking devices.

Other features and advantages of the present invention will be apparent from the following more detailed description of the preferred embodiments taken in conjunction with the accompanying drawings, which illustrate by way of example the principles of the invention. The scope of the invention is not, however, limited to these preferred embodiments.

DETAILED DESCRIPTION AND PREFERRED EMBODIMENTS

The invention is best understood by reference to the drawings. In the basic process of this invention, a film or paper web, which may or may not contain preprinted or embossed images upon it, and which is metallized on one or both sides, is sent through a demetallization process on a printing press to create RF antenna(s) on one or both sides of the web.

Figure 1:
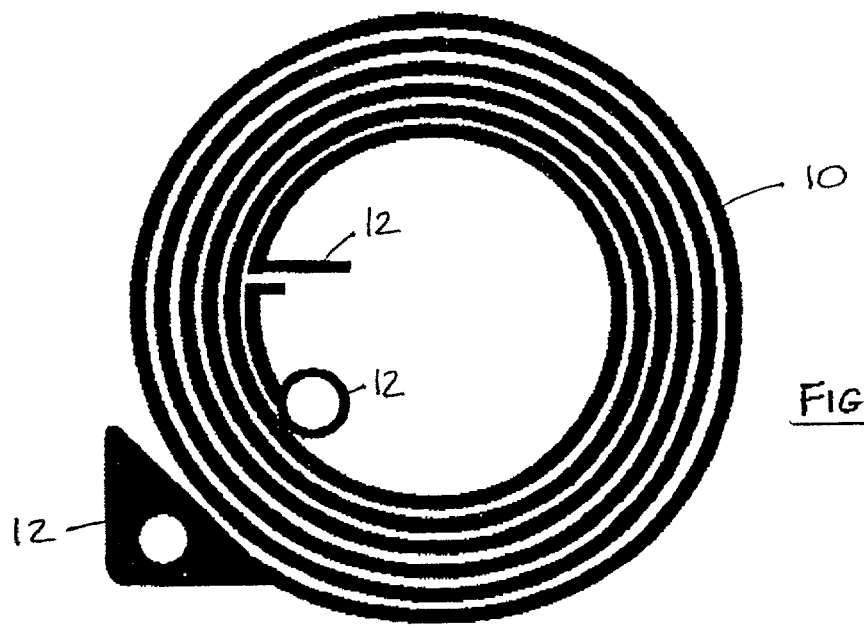
FIG. 1 is a plan view of a typical RF antenna configuration.
Figure 2:
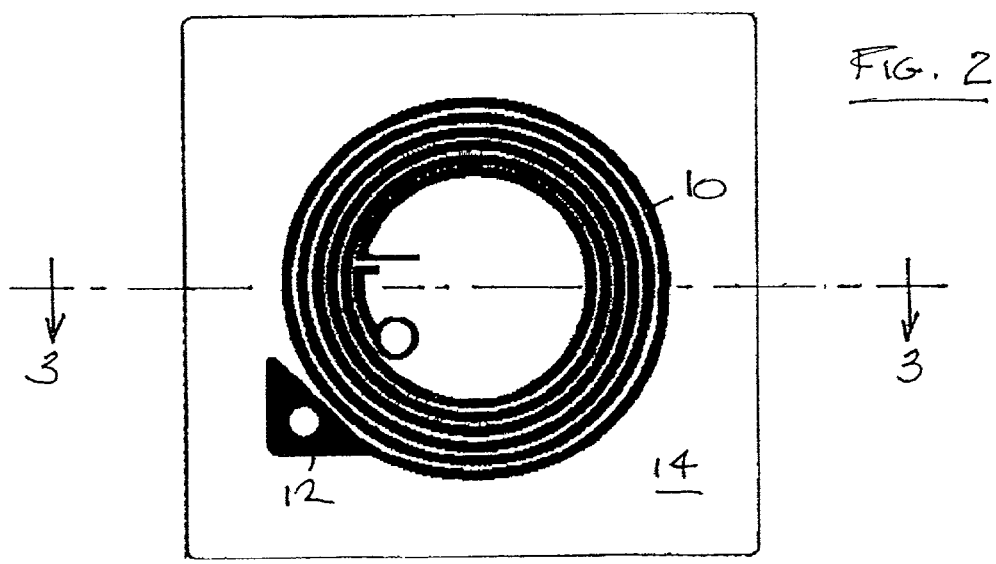
FIG. 2 is a plan view of the RF antenna of FIG. 1 shown positioned on the web backing that creates the tag or label.

FIG. 1 is a plan view of a radio frequency (RF) antenna 10 which contains junction areas 12 for connection to conventional RF antenna circuitry. FIG. 2 is a plan view of the RF antenna 10 of FIG. 1 tag formed by demetallization on the surface of a substrate 14, in the manner to be described below. The substrate 14 will be a paper or film web and which contains a metallized layer 16 (see FIG. 7) on one or both sides, from which the RF antenna(s) are formed. The combination of the web and the antenna(s) can be used for conventional RF tags or labels. The metal 16 used for metallization of the web material can be aluminum, copper, silver or other conductive metal depending upon the RF application. Commonly the thickness of the demetallized antenna is 0.001–0.25 µm, preferably 0.02–0.06 µm, depending upon the required application. The thickness of the resulting tag or label is 10–100 µn, preferably 20–50 µm. The antenna thickness is normally <2%, preferably <1%, of the tag or label thickness, so for practical purposes the thickness of the tag or label can be considered to be the thickness of the substrate itself.

Figure 3:
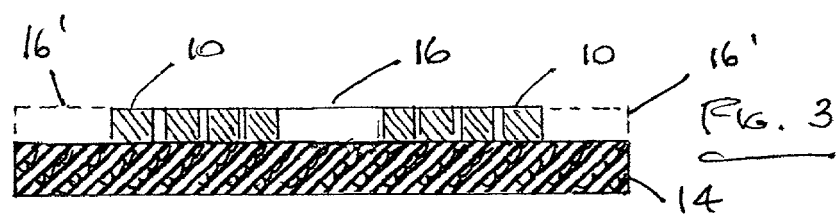
FIG. 3 is a cross-sectional view taken on Line 3—3 of FIG. 2.
Figure 4:
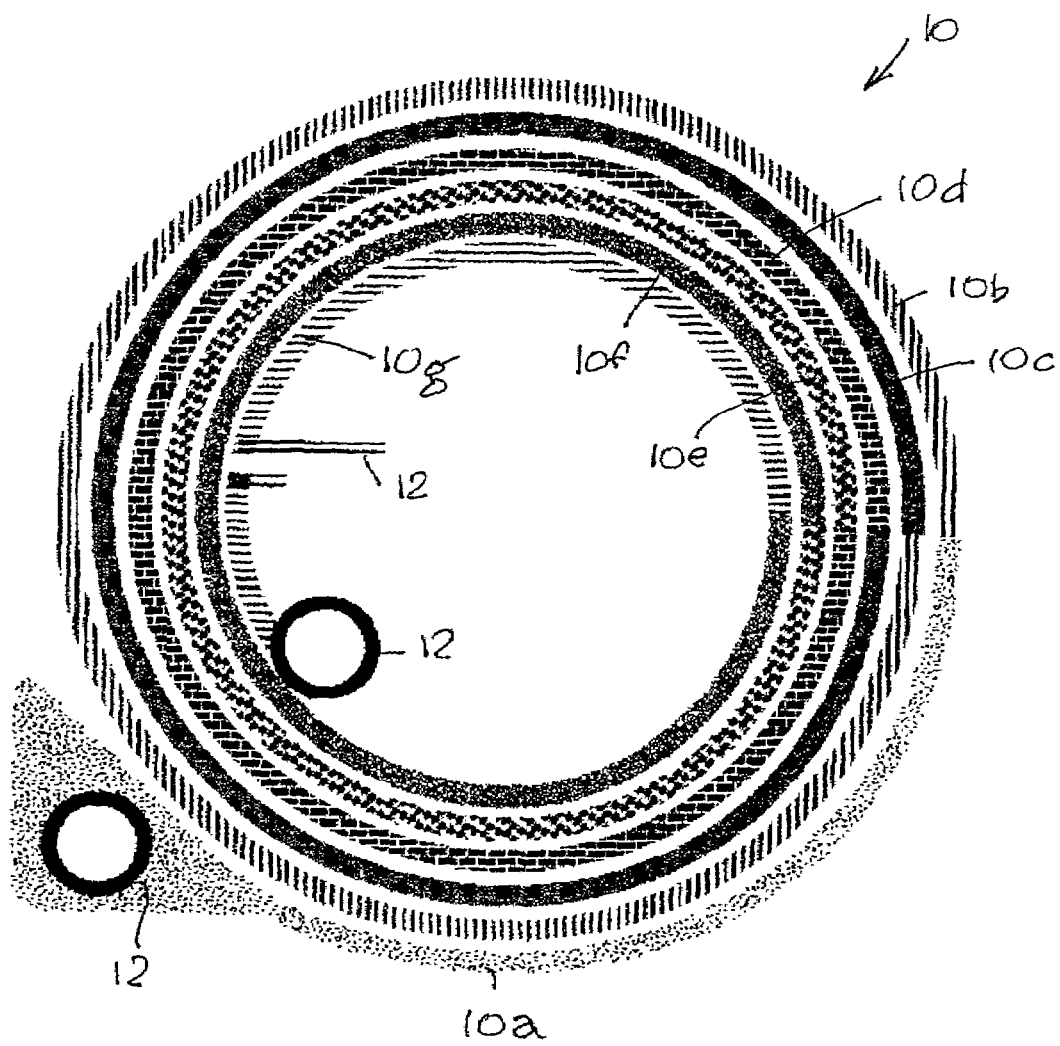
FIG. 4 is a schematic diagram illustrating an example of a single RF antenna demetallized in different densities.

The demetallization is schematically illustrated in FIG. 3, where portions 16' of the metal layer 16 are shown as removed, leaving the RF antenna 10 formed as the residual metal layer 16. It will also be seen from FIG. 4 that the degree of demetallization can be controlled such that while the portions 16' of the metal layer which are not wanted are removed completely, other portions can be demetallized to greater or lesser degrees. This is accomplished by variation according to the pattern on the face plates of the demetallization roller 30. The etchant 34 may at any point remove the entire local depth of the metal layer, or may merely thin it in a greater or lesser amount. The demetallization in any local area can therefore result in one or more lines, dots or other shapes where the metal is removed or thinned, or an array of small adjacent regions of metal and metal removal, in patterns analogous to halftone printing with inks. Thus it is possible to formed an RF antenna with, for instance, different portions 10a, 10b, 10c, 10d, 10e, 10f and 10g, being of different metal densities.

Figure 7:
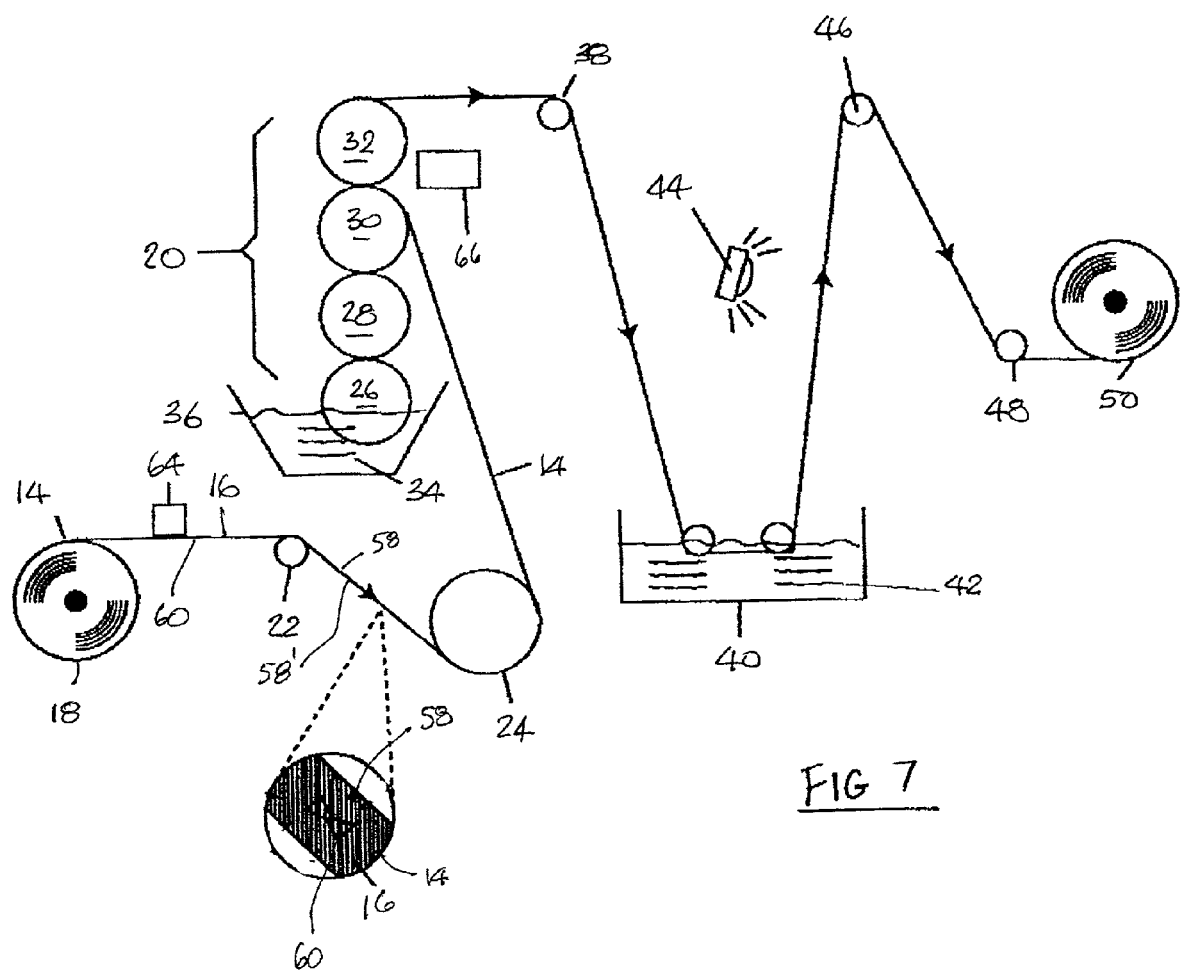
FIG. 7 is a schematic diagram illustrating the creation of RF antennas through the demetallization process on a standard printing press.

FIG. 7 illustrates the creation of antennas 10 directly on a metallized web substrate 14 by using a demetallization process on a standard printing press with specialized stations that are modified very simply to allow for demetallization and washing. A continuous film or paper web 14 which has been metallized on one or both sides with metal layers 16 is unwound from a continuous roll 18. The web 14 moves to the demetallization station 20 along the press rollers 22 and 24. At the demetallization station, the web moves through a series of press rollers 26, 28, 30 and 32. The demetallization station 20 is essentially a printing station as might normally deposit ink, but in this case deposits a caustic substance or etchant 34 from tank 36, capable of removing specific portions 16' of the metal 16 from web material 14. This chemical etchant 34, usually sodium hydroxide (NaOH) in solution, is deposited onto the web 14 around the antenna pattern or design as determined by the design/printing plates mounted on roll 30, thus removing the metal 16'0 from the substrate 14 in a pattern around each antenna 10, so that the antenna 10 itself remains metallized. The etchant 34 oxidizes the metal to powder in the areas applied. The web 14 is then routed by roller 38 to a washing station 40 where the powder is removed by washing in water 42. The web 14 then travels past a drying station where a heat source 44, for example an infrared lamp, removes all water 42 from the web surface. The web 14 is then routed by rollers 46 and 48 to rewinding cylinder 50 where it is rewound into a roll.

Figure 6:
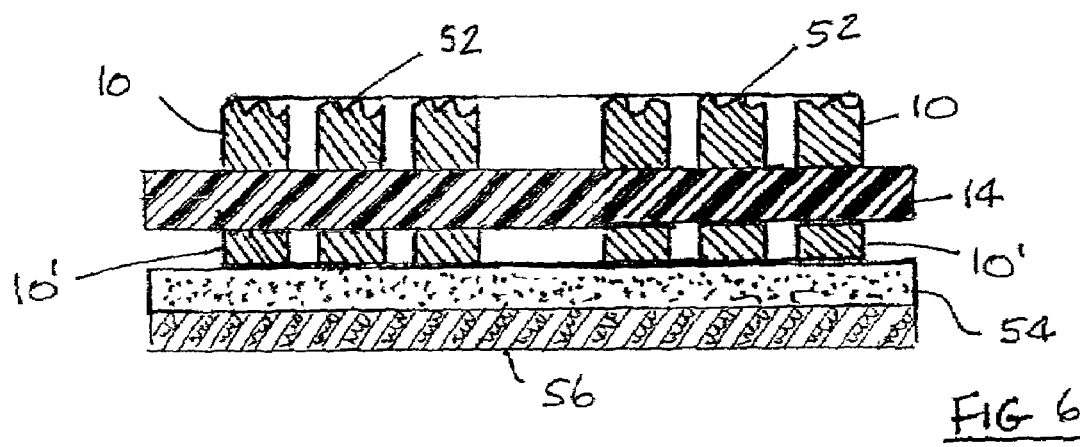
FIG. 6 is a cross sectional view of a web containing antennas on both sides with holography on one of the antennas and an adhesive and siliconized release paper attached to form a label or tag.

The web 14 containing the antennas 10 is sent to an RF device installation machine where conventional RF circuitry (not shown) is attached to the antennas through connection areas 12. After the RF circuitry is attached, the web with its antennas and RF circuitry can be prepared for label or tag applications by treatment on a standard press where adhesive 54 is applied and a siliconized paper or other release liner 56 is married through the adhesive to the label or tag. If the tag or label has an antenna 10 on only one side of the web 14 (as in FIG. 3) the adhesive will be applied directly to the side of the web 14 that does not contain the antenna. If the web 14 contains antennas 10 and 10' on both sides of the web 14 (as in FIG. 6) the adhesive can be applied to either side directly on the top surface of the antenna (e.g., 10') on that selected side. The web can then proceed through a standard kiss cutting station where the web containing the antennas is cut into the appropriate size labels or tags. No lamination to another web or substrate is required.

Figure 5:
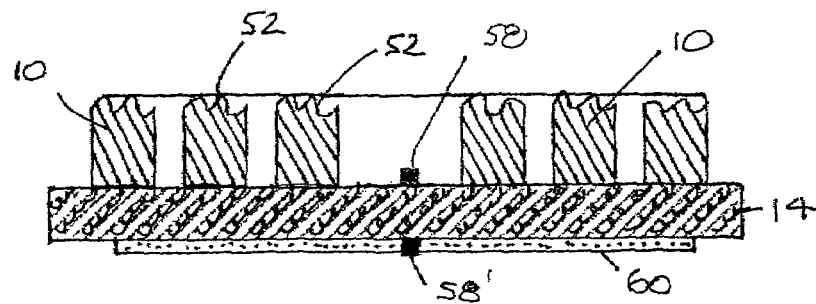
FIG. 5 is a schematic diagram illustrating an RF antenna in register with a preprinted image on the opposite side of the substrate, and also illustrating a holographic image embossed on the surface of the RF antenna.

FIG. 5 illustrates how a web 14 containing the antenna(s) to form the labels or tags can also contain images 52 on the surface of the antenna which is on the side that is not part of a wallpaper or other continuous pattern. These sources of these images have been described above. The web 14 may also contain specific images 60 which must be aligned with the antennas 10 on the reverse side, so the antennas must be demetallized in register with the preprinted or embossed images 60 on the opposite side of the web. (See FIG. 5.) Registration is accomplished through use of registration indicia ("eye marks") 58 and 58' in a conventional printing manner. The registration process ensures that the removal of the metal occurs exactly where it is desired in relation to the printed or embossed images. The process described in this invention has significant security applications as well as packaging enhancement applications.

FIG. 7 also illustrates the demetallization-registration process on a standard printing press. The image-printed continuous film or paper web 14 has been metallized on one side by metal layer 16 with registration marks 58 and 58' already printed next to one or more of images 60 (indicated as covered by the metal layer 16 in the inset). If it has been rewound into a roll (also represented by 18) after the printing or embossing, it must be unwound from the continuous roll 18 with the metallized side up. As the web 14 moves to the demetallization station 20 along the press rollers 22 and 24, the registration or eye marks 58 and 58' on the web material 14 are read by a registration sensor 64 which relays the information as a signal to the demetallization station 20. At the demetallization station, the web 14 moves through the bank of press rollers 26, 28, 30 and 32. The speed at which the web 14 travels is determined by the registration information conveyed by the registration sensor 64 to the demetallization station 20 and is controlled by a servo motor 66 attached to the demetallization station. The application of the registration information is determined by a simple computer software program which causes the servo motor 66 to spin faster or slower depending upon the registration information. The servo motor 66 then adjusts the speed of the demetallization station roller 32 and thus the speed at which the web 14 travels in order to ensure that the demetallization occurs exactly where designed in relation to the original images 60.

The key aspect in this embodiment of the invention is the registration process. Without the "reading" of the registration marks 58 and 58' on the preprinted images 60 and the antennas 10, the antennas cannot be demetallized exactly where desired in relation to the original images. Fiber optic, laser, and other sensors or sensing devices 64 are readily available from sensing device vendors, readily identified by publications such as the Thomas Register.

The washing station 40 for removal of the oxidized metal 16' also uses a standard inking station, in which the washing solution 42 is water.

The drying station with heating device 44 is standard equipment on flexographic presses for drying inks.

Because RF antennas are widely used, applications for this invention include, but are not limited to, labels and seals to track virtually anything, memory chips that can contain substantial information about the products they are applied to, verification or identification devices for purchases through the Internet (for example, event tickets); grocery store products, RF ID tagging of antitheft devices, product packaging of all types, credit cards, passports, admission tickets, stamps, vehicles, badges, fare cards, roadway tolls, customs and immigration checkpoints, and animal identification/tracking devices.

An example of an enhanced security application is a security label containing an image where the owner wants to ensure the product label cannot be counterfeited in addition to having an RF antenna for tracking or identifying the product. A design or pattern is selected that can be "hidden" in the original image by demetallizing a selected area, image or part of an image that may not be detectable to the unaided eye. In the case of a holographic image, a section containing a hidden code, numbers, or microtext may be demetallized or the area around a code, number or microtext may be demetallized. The RF antenna itself may contain a holographic image, within which can be a hidden code, numbers, or microtext.

Figure 8:
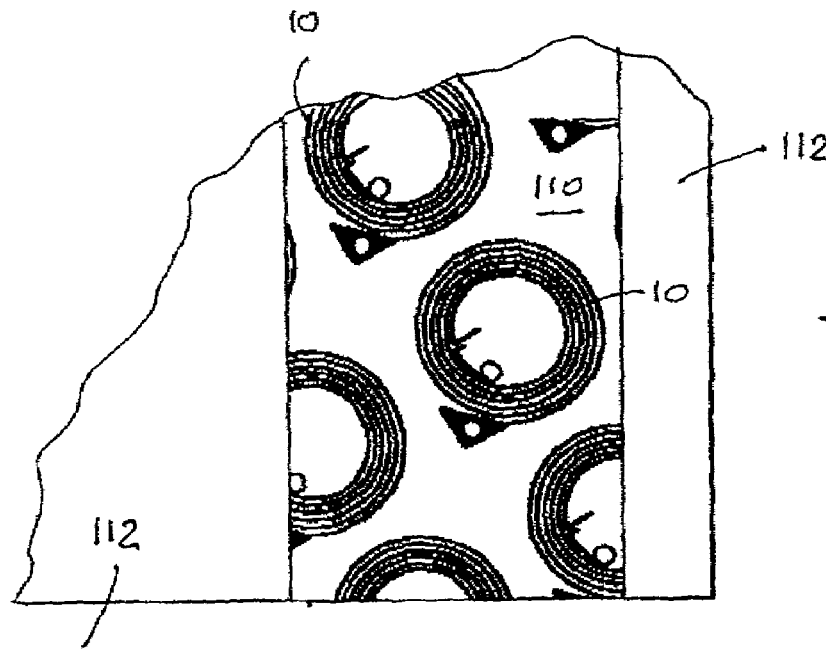
FIG. 8 is a schematic diagram illustrating packaging applications for the demetallization of antennas such as food packaging with multiple antennas in a wall paper configuration.
Figure 9:
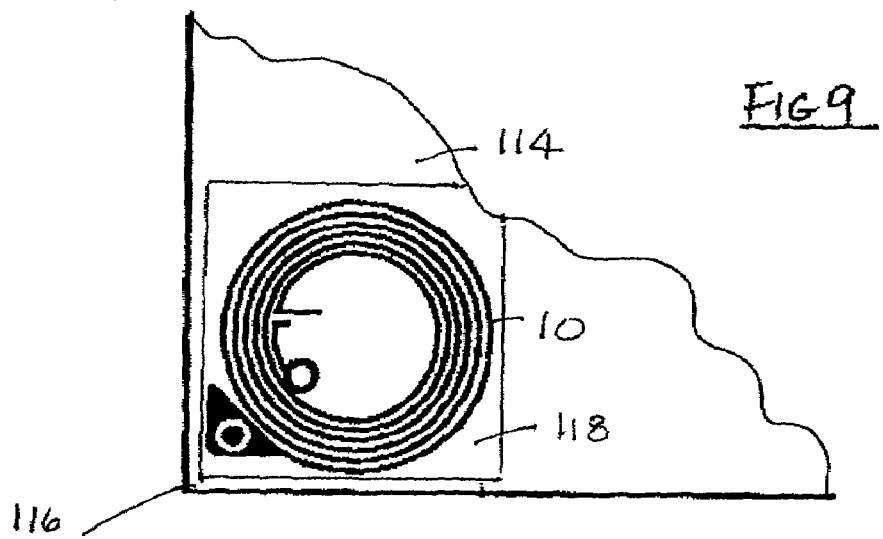
FIG. 9 is a schematic diagram similar to FIG. 8 and illustrating another packaging application such as an antenna in registration with a specific surface area of rigid packaging, such as a box.

Examples of two applications of use of the RF antenna tags or labels are shown in FIGS. 8 and 9. FIG. 8 shows a tag or label 110 containing RF antennas 10 placed in a "wallpaper" patten on a flexible substrate such as a potato chip bag 112. Similarly FIG. 9 shows a tag or label 118 containing a single antenna 10 placed in registration with a specific location on a box 114, in this case a corner 116 of the box. Either or both of these of course can be done on many different types of flexible or rigid packaging such as boxes, bags or other containers for products or on the products themselves.

Figure 10:
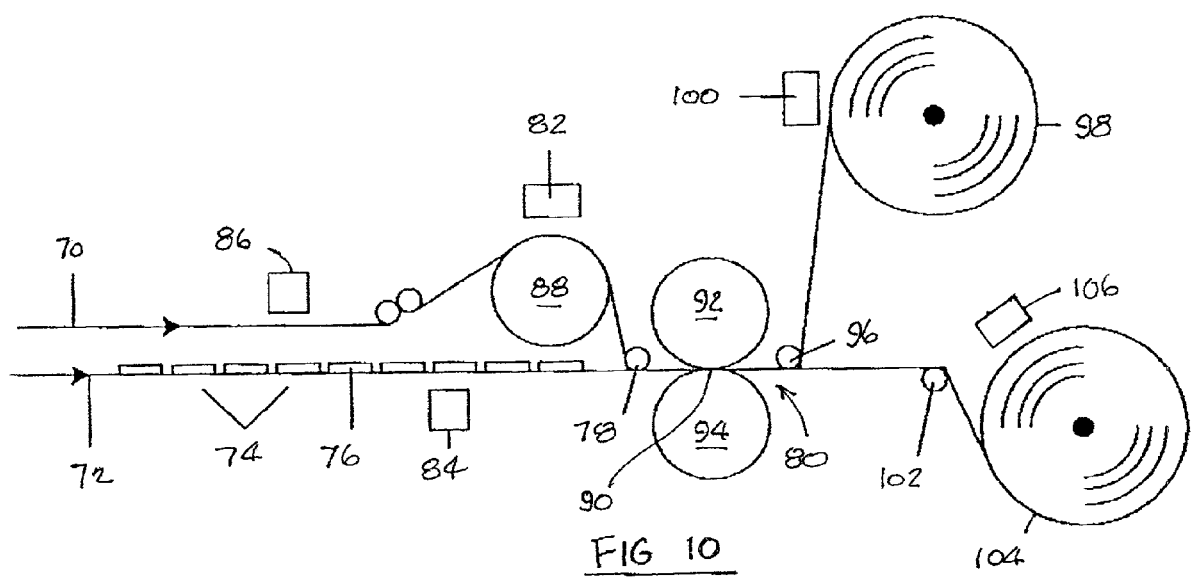
FIG. 10 is a schematic diagram illustrating a cold foil stamping process for creating antennas.

It is also contemplated that demetallizing an RF antenna can be integrated with a cold foil stamping process. FIG. 10 shows this process in detail. A cold foil web 70 has demetallized antennas after exiting from the process of FIG. 7, and will have eye marks (equivalent to 58) for registration with a substrate 72, such as a paper web, to which the demetallized antennas ("patches") are transferred. The discrete areas of adhesive 76 are applied to the substrate 72 at station 74. The adhesive areas also have corresponding eye marks (equivalent to 58') for registration with the antennas. The web 70 and substrate 72 are aligned facing each other by roller 78 at the entrance to station 80. A registration sensor 86 registers the antenna locations on web 70 by their eye marks and a similar sensor 84 registers the adhesive pattern locations on substrate 72 by their eye marks. Both sensors relay their registration information to indexing means 82, such as a servo motor, attached to press roller 88 located just before the alignment nip 90. The speed of foil web 70 is adjusted to ensure registration with the substrate 72 through the marrying zone 80. In zone 80 the two webs 70 and 72 travel into the nip of press rollers 92 and 94 where the adhesive areas 76 are pressure joined to the undersurface of the foil web 70, each in registration with a corresponding antenna. As the two married webs pass the rollers 92 and 94 and reach the end of zone 80, they encounter separation roller 96. The foil web 70 is curved around roller 96 while the substrate 72 travels in a straight path causing the antenna/adhesive patches to peel away from the foil 70 and remain adhered to the substrate 72. The stripped foil web 70 is then wound onto take-up roller 98 (which is rotated by a motor 100) where it is collected for reuse, discard, or other purpose. The substrate 72, now having on its surface the transferred antennas, continues on over guide roller 102 to take-up roller 104 (also driven by a similar motor 106) for collection.

The demetallization process described by this invention can be used on any type of film or paper and uses standard printing presses including flexographic presses, rotogravure, letterpress and offset printing presses, and associated conventional equipment. These presses require the addition of at least one registration setup including registration sensors, and the modification of a standard inking station to perform the demetallization process. The equipment required to apply the method this invention can be purchased from standard printing industry vendors, which also may be found in standard publications such as the Thomas Register.

It will be evident that there are numerous embodiments of the present invention which are not expressly described above but which are clearly within the scope and spirit of the present invention. The above description is therefore intended to be exemplary only, and the actual scope of the invention is to be determined from the appended claims.

I claim:

1. A method for formation of a radio frequency antenna of a predetermined pattern on a surface of a substrate, comprising:

applying a metal layer to a surface area of the substrate, applying an etchant to the predetermined pattern to the metal layer using a flexographic printing press and thereafter removing a portion of the metal layer comprising all metal within the surface area on the substrate other than metal in the predetermined pattern comprising the antenna, and placing a holographic image on the metal of the antenna.

2. The method as in claim 1 wherein the step of removing the portion of the metal layer results in the formation of a plurality of antennas.

3. The method as in claim 2 further comprising subdividing the substrate into a plurality of segments, each segment having contained thereon a single antenna of the plurality of antennas.

4. The method as in claim 2 wherein at least two antennas of the plurality of antennas are of different shapes.

5. The method as in claim 2 wherein at least two antennas of the plurality of antennas are of different metal thicknesses or densities.

6. The method as in claim 1 herein the antenna comprises at least two portions, one of the portions having a density of metal different from another of the portions.

7. The method as in claim 1 wherein the substrate comprises a web material.

8. The method as in claim 7 wherein the web material is selected from the group consisting of film and paper.

9. The method as in claim 1 wherein metal is placed on both sides of the substrate.

10. The method as in claim 9 wherein antennas are formed by demetallization on both sides of the substrate.

11. The method as in claim 10 wherein antennas on each side of the substrate are of different shapes.

12. The method as in claim 10 wherein antennas on each side of the substrate are of different metal thicknesses or densities.

13. The method as in claim 10 wherein antennas on each side of the substrate are of a single shape.

14. The method as in claim 10 wherein antennas on each side of the substrate are of a single metal thickness or density.

15. A method for formation of a radio frequency antenna of a predetermined pattern on a surface of a substrate comprising applying a metal layer to a surface area of the substrate, applying an etchant to the predetermined pattern to the metal layer and thereafter removing a portion of the metal layer comprising all metal within the surface area on the substrate other than metal in the predetermined pattern comprising the antenna, further comprising a demetallized web containing the antenna to a cold foil stamping process whereby the antenna is transferred to a second web through a marrying zone registration.

16. The method as in claim 15 further comprising having registration indicia placed on the substrate and the second web and passing the substrate containing the demetallized antenna and the second web through a marrying zone in registration.

17. A method as in claim 16 wherein the registration is accomplished by adjusting linear speed of either of the substrate or the second web relative to the other.

18. The method as in claim 17 wherein adjustment of the linear speed is controlled by a microprocessor.

* * * * *